Sept. 8, 1953
C. B. RICHEY
2,651,156
ROOT CROP LIFTER
Filed April 19, 1950
2 Sheets-Sheet 1
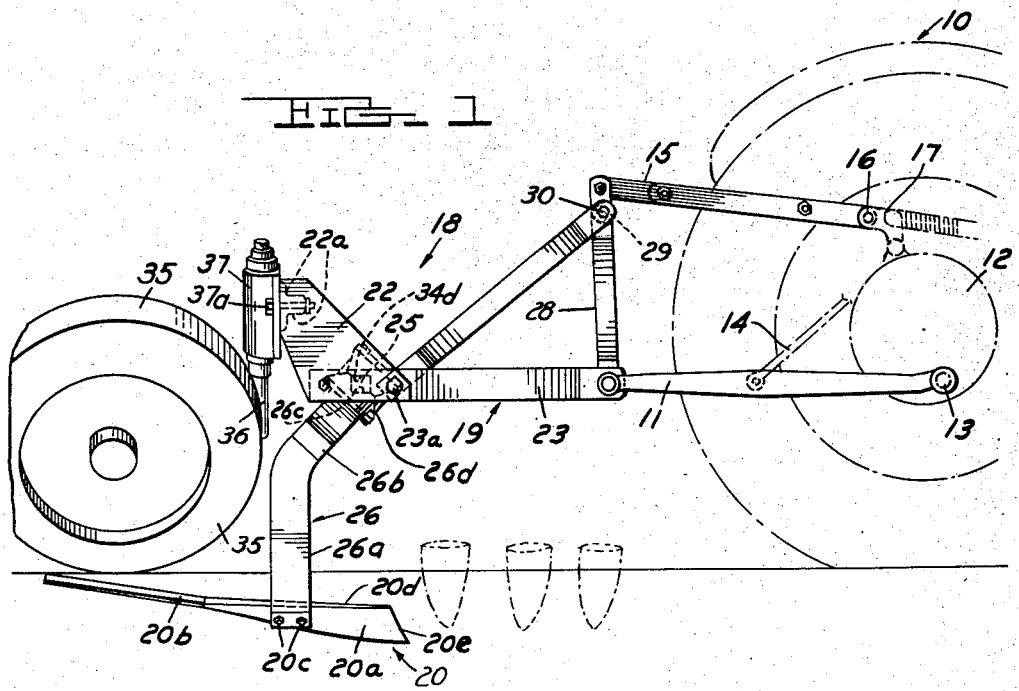
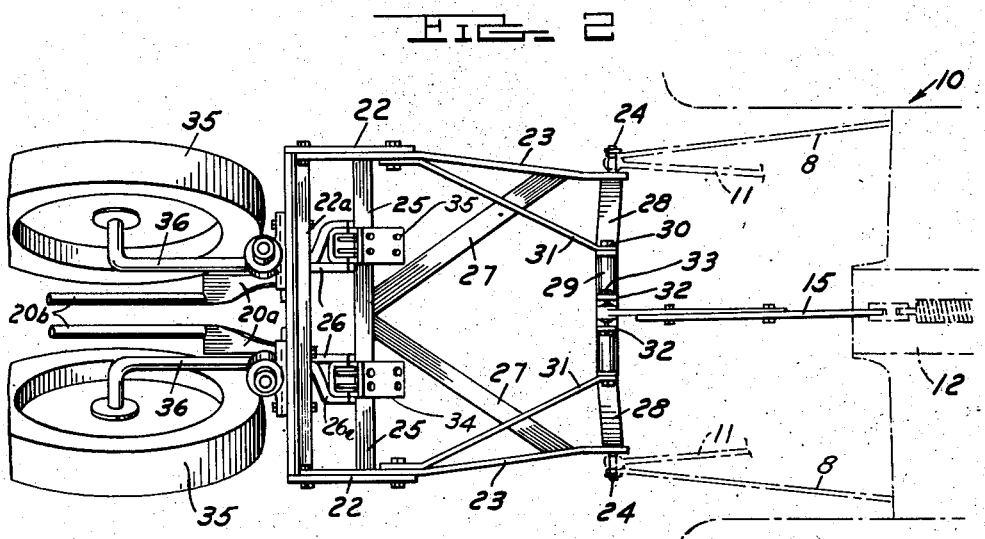
INVENTOR.
Clarence B. Richey
BY
ATTORNEY

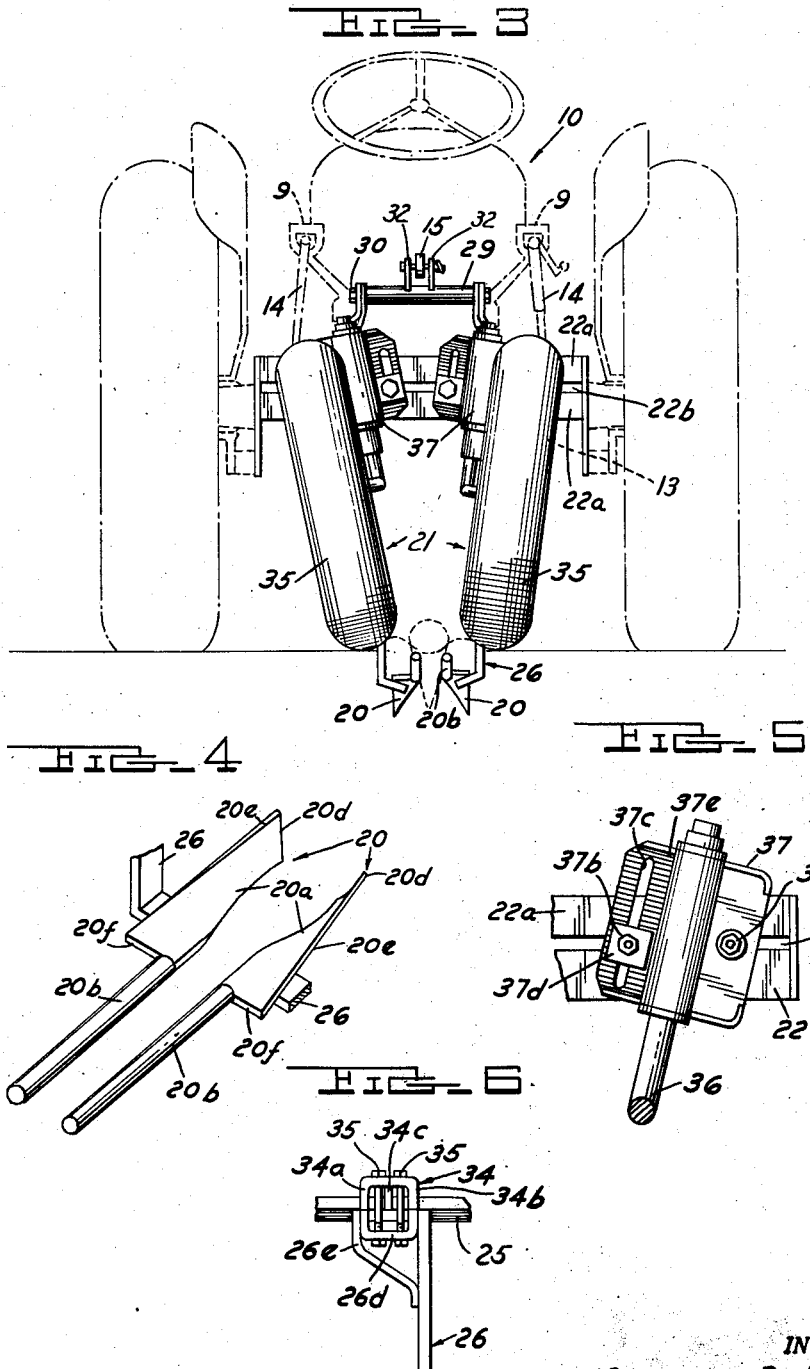

Patented Sept. 8, 1953

2,651,156

UNITED STATES PATENT OFFICE 2,651,156

ROOT CROP LIFTER

Clarence B. Richey, Royal Oak, Mich., assignor to Dearborn Motors Corporation, Highland Park, Mich., a corporation of Delaware Application April 19, 1950, Serial No. 156,847

2 Claims. (Cl. 55—106)

This invention relates to an improved root crop digging or lifting device for dislodgment of the root crop from the soil.

The dislodgment and subsequent lifting of root crops from the soil, particularly sugar beets, has not been entirely satisfactorily accomplished up to the present time because the beets have not been freed and elevated sufficiently from the surrounding soil to permit the beet to be conveniently picked up for removal of such beets from the field. Soil adherence to the beets has also been a problem and hence root crop harvesting has been both time consuming and expensive.

Accordingly, it is an object of this invention to provide an improved root crop digger for raising root crops out of the ground in condition for subsequent gathering by a loader.

Another object of this invention is to provide an improved root crop lifter adapted for convenient mounting on the power operated trailing draft links of conventional tractors.

A further object of this invention is to provide an improved root crop lifter for loosening such root crops relative to the soil and for elevating such crops out of the soil, relatively free of adhering soil.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention.

On the drawings:

Figure 1 is a side elevational view of the improved beet lifting device of this invention shown mounted on a tractor with parts shown in dot dash lines.

Figure 2 is a plan view of Figure 1 with parts shown in dot dash lines.

Figure 3 is a rear elevational view of Figure 1 with parts shown in dot dash lines.

Figure 4 is an enlarged detail perspective view of the beet lifting blades.

Figure 5 is an enlarged detail view of the press wheel mounting bracket.

Figure 6 is an enlarged detail view of the lifting blade support arm shown clamped to the tool bar.

As shown on the drawings:

In Figure 1 there is shown the rear end portion of a well known type of tractor 10 having one wheel removed to better illustrate the mounting thereon of the improved beet lifter of this invention to be described. Tractor 10 has a pair of transversely spaced draft links 11 pivoted to the rear axle housing 12 of tractor 10 as at 13. A pair of hydraulically operated lift arms 9 are provided on the tractor and such arms are raised by a built-in hydraulically operated ram (not shown). The lift arms are respectively connected to the draft links 11 by connecting rods 14. Thus draft links 11 may be vertically raised or lowered by the power operated lift arms of the tractor. A top positioning link 15 is pivotally connected at 16 to an L-shaped lug 17 provided on top of axle housing 12.

The beet lifting device 18 comprises a frame 19 on which there is mounted a pair of beet lifting blades 20 and to the rear of the blades 20, a pair of press wheels 35. Frame 19 comprises a pair of end plates 22 transversely spaced by a pair of angle iron members 22a secured as by welding to the rear edges of such plates. Angle iron members 22a are disposed one above the other and are vertically spaced apart to define a longitudinal opening or slot 22b. A rectangular tool bar 25 is transversely disposed between end plates 21 and the ends of such bar are respectively welded to arms 23 as shown in Figure 2. Bar 25 is provided for mounting a pair of tool standards 26 thereon as will be later described.

A horizontally disposed, forwardly extending arm 23 is secured to the lower bottom edge of each side plate 22 as shown in Figures 1 and 2 as by bolts 23a. Arms 23 are deformed inwardly, as best shown in Figure 2, to bring forward the ends thereof closer together and a transverse mounting pin 24 is secured by welding to each of the forward ends of arms 23.

Arms 23 are laterally braced by a pair of diagonal brace members 27, respectively secured by welding at one end to arms 23 and at the other end to the center of transverse tool bar 25. A pair of vertically disposed strap-like members 28 are respectively secured at their lower ends to arms 23 adjacent the pins 24, and such members slope upwardly and inwardly for connection to a transverse tube 29 by a bolt 30 insertable through such tube. A pair of stabilizing braces 31 are also respectively connected to opposite ends of tube member 29 by the bolt 30 and such braces slope downwardly and rearwardly so that the ends thereof contact arms 23, and at such point, are welded thereto. A pair of upstanding, transversely spaced lugs 32 are welded to the top of transverse tube member 29 and the tractor top link 15 is pivotally mounted between such upstanding lugs by a transverse bolt 33. Tractor draft links 11 are respectively mounted on pins 24 and a pair of stabilizing bars 8 conventionally secured at one end to tractor housing 12 may also be mounted on pins 24 to eliminate side sway of frame 19 relative to the tractor.

A pair of tool standards 26 are provided to support the beet lifters in proper working relationship relative to the row of beets and such standards comprise essentially a rectangular bar having a lower vertical portion 26a and a forwardly sloped upper portion 26b. A substantially V-shaped notch 26c is provided in the upper end of each tool support 26, as best shown in Figure 1, and a U-shaped bracket 26d having a notch in the end of each arm thereof, corresponding to notch 26c, is secured as by welding to the upper end 26b of standard 26 with the V-shaped notches in transverse alignment. The outwardly extending arm of bracket 26d is supported by a brace member 26e respectively welded at opposite ends to the other leg portion of bracket 26d and to the standard 26.

Notches 26c permit standard 26 to snugly fit against the lowermost and rearwardly projecting edge of tool bar 25 as shown in Figure 1 and such standard is secured to tool bar 26 by a clamp 34. Clamp 34 comprises essentially a U-shaped member having leg portions 34a and 34b. A third leg 34c is secured by welding to the bight portion of clamp 34 intermediate the legs 34a and 34b. Each of such legs is provided with a V-shaped end notch 34d which permits such clamp to surround the corner of tool bar 25 opposed to the bent end portion 26b of tool standard 26. Clamp 34 is secured to bracket 26d by a plurality of bolts 35, thus tool standard 26 is rigidly clamped to tool bar 25 and is supported thereto in depending relationship.

The bottom end of each tool standard 26 is bent inwardly and flared to accommodate the curved outer surface of the beet lifter 20. Beet lifters 20 comprise a blade portion 20a of conventional construction having a curved surface as shown in Figure 4. Each blade portion 20a has a straight upper edge 20d and a substantially vertical leading or cutting edge 20e. The blades each curve inwardly and terminate in a horizontal trailing edge 20f. A rearwardly projecting rod 20b is secured by welding to the rear end 20f of each lifter blade 20 as shown in Figures 1 and 4 and each of such rods slopes upwardly for further elevating the beet dislodged by the lifter blades 20a. Each lifter blade 20 is secured to the flared lower end of tool standard 26 by a pair of screws 20c.

After the beets are elevated by blades 20 and rods 20b, the adjacent soil is subjected to the action of a pair of press wheels 35. Each press wheel 35 preferably comprises a standard rubber tired implement wheel rotatably mounted on a crank shaped axle 36, the top portion of such axle being adjustably supported by a bracket 37 as best shown in Figure 5. However, other forms of resilient periphery may be employed on the press wheels. Each bracket 37 is pivotally mounted on the angle bars 22a by a bolt 37a insertable in a suitable transverse hole and cooperable with longitudinal slot 22b of the frame angles 22a whereby such brackets are transversely adjustable relative to the tractor so that the pair of wheels 35 may be set at any desired spacing and at any lateral position with respect to the tractor. A second bolt 37b cooperates with a vertical slot 37c in each bracket and slot 22b to tighten a clamp member 37d against a serrated surface 37e adjacent slot 37c to lock such bracket in a desired position of angular adjustment of press wheels 35. The wheels are preferably disposed in a V-shaped arrangement with sufficient space between their lowermost points to admit the largest beets therebetween.

In the operation of the improved beet lifter of this invention, the tops of the beets are first cut off by well known types of machines and then the tractor on which the improved beet lifter of this invention is mounted, is first positioned over a row of beets or other root crops to be removed from the soil and then the draft links 11 are lowered so that lifter blades 20a contact the soil. When the tractor is set in motion, blades 20a bite into the soil and dig around and beneath the beets, the press wheels 35 acting as gage wheels to limit the working depth of the blades. The beets contacted by the blades 20a are urged upwardly by the upward camming action of such blades and, as the tractor moves forwardly, each of the beets is gradually raised upwardly along the length of the blades 20a and then forced upwardly to a greater extent by rods 20b.

When press wheels 35 have been properly preset to approximately the position shown in Figure 3, then each of such wheels contacts the loosened ground laterally adjacent each beet. Beet lifters 20 in raising the beets from the ground simultaneously raise a ridge of dirt along the row carrying the beets therewith and as the beet lifters move forwardly the dirt passes between press wheels 35. As such dirt passes between press wheels 35 a crushing action takes place whereby the clods of dirt are pulverized between the sides of the press wheel and this action substantially frees the beet from adhering soil. The contact of press wheels 35 with the soil tends to push some of the dirt underneath the beets thereby facilitating their lifting and the removal of dirt from such beets. The press wheels also tend to guide the beets so that such beets will move uniformly along the rods 20b.

It will thus appear from the above description that there is here provided a root crop lifting implement which positively loosens and raises the beet or other root crop from the soil to facilitate gathering of such root crops. The beet lifting implement is of simple yet sturdy construction to provide a long useful life and yet an implement which is readily mounted on the trailing draft links of a tractor which can be readily raised or lowered into ground engaging relationship and for ease in transporting to the working area. The root crops lifted by this improved beet lifter are left on the ground surface in a clean condition substantially free from adhering soil particles.

It will, of course, be understood that various details of construction may be varied through a wide range without departing from the principles of this invention and it is, therefore, not the purpose to limit the patent granted hereon otherwise than necessitated by the scope of the appended claims.

I claim:

1. In a root crop harvesting implement having a pair of substantially parallel transversely spaced root crop lifting blades each having a forward cutting portion and a rear lifting portion, the improvements comprising a trailing rod mounted on each of said lifting blades in substantial longitudinal alignment therewith, the lifting portions of said blades and said rods being laterally spaced apart less than the width of the root crop, and each of said rods also being inclined upwardly in a rearward direction, whereby a root crop engaged by said blades is raised vertically by said rods, and a pair of ground engaging wheels mounted on the implement on axles, a vertical plane passing through said axles intersecting the rods intermediate the ends thereof, the ground-engaging portions of said wheels lying laterally adjacent the rods.

2. The combination of claim 1 wherein said pair of ground-engaging wheels are mounted on said axles so that said wheels are canted from a true vertical plane with the ground engaging portions of the wheels being closer together than the uppermost portions thereof.

CLARENCE B. RICHEY.

References Cited in the file of this patent

UNITED STATES PATENTS

| Number | Name | Date |
| --- | --- | --- |
| 1,099,540 | Douglass | June 9, 1914 |
| 1,149,644 | Graham | Aug. 10, 1915 |
| 1,182,149 | Douglass | May 9, 1916 |
| 1,513,496 | Elias | Oct. 28, 1924 |
| 2,249,637 | Rietz | July 15, 1941 |